Nov. 9, 1937.  W. SHAKESPEARE, JR  2,098,404

FISHING REEL

Original Filed March 21, 1935

INVENTOR.
William Shakespeare Jr.
BY
Chappell, Earl Chappell
ATTORNEYS

Patented Nov. 9, 1937

2,098,404

UNITED STATES PATENT OFFICE 2,098,404

FISHING REEL

William Shakespeare, Jr., Kalamazoo, Mich., assignor to Shakespeare Company, Kalamazoo, Mich.

Original application March 21, 1935, Serial No. 12,138. Patent No. 2,035,279, dated March 24, 1936. Divided and this application March 14, 1936, Serial No. 68,820

5 Claims. (Cl. 242—84.5)

This application is a division of my application for Letters Patent filed March 21, 1935, Serial No. 12,138 now Patent No. 2,035,279.

The main objects of this invention are:

First, to provide in a fishing reel an improved brake or drag means which is highly efficient and at the same time is simple and economical in its parts and the parts are so arranged that there is little strain or wear thereon.

Second, to provide in a fishing reel an improved brake or drag means having its adjusting means located at the base of the crank.

Third, to provide in a fishing reel an improved brake or drag means with threaded adjustment so that it is very sensitive and capable of easy manipulation for the desired degree of braking action from its maximum to its minimum and does not tend to become displaced from its adjusted position.

Objects relating to details and economies of the invention will appear from the description to follow. The invention is defined and pointed out in the claims.

A preferred embodiment of the invention is illustrated in the accompanying drawing, in which.

Figure 1:
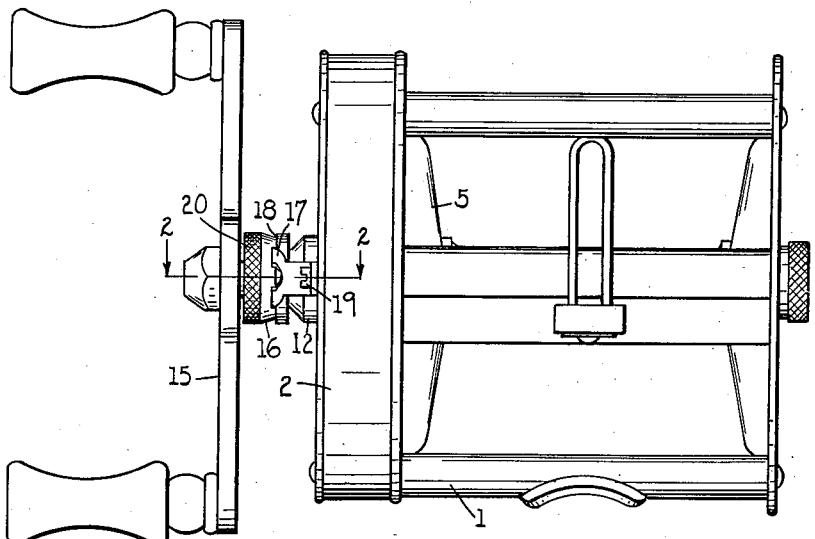
Fig. 1 is a front elevation of a fishing reel of the level wind type embodying the features of my invention.

In the embodiment of my invention illustrated, 1 designates a fishing reel frame which is provided with a chambered head 2. The crankshaft 3 is connected to the shaft 4 of the spool 5 by means of the gear 6 on the shaft 3 and the coacting pinion 7 on the spool shaft.

The crankshaft 3 is supported by the stub shaft or spindle 8 carried by the inner wall 9 of the head 2, the shaft being tubular to receive the spindle. The outer wall 10 of the chambered head is provided with an opening 11 in which the collar or thimble 12 is secured in concentric relation to the crankshaft and its stub shaft 8.

The collar or thimble 12 is shouldered at 13 and is spun over or upset at 14 on the inner side of the head plate 10. The crank 15 is suitably secured on the outer end of the shaft 3.

The brake adjusting member 16 is threaded on the thimble or collar 12, its outward adjustment or movement being limited by the stop 17 coacting with the annular shoulder 18 on the adjusting member. This stop is secured to the outer head plate by means of the screw 19. The adjusting member is preferably knurled at 20 to facilitate grasping.

Figures 2, 3:
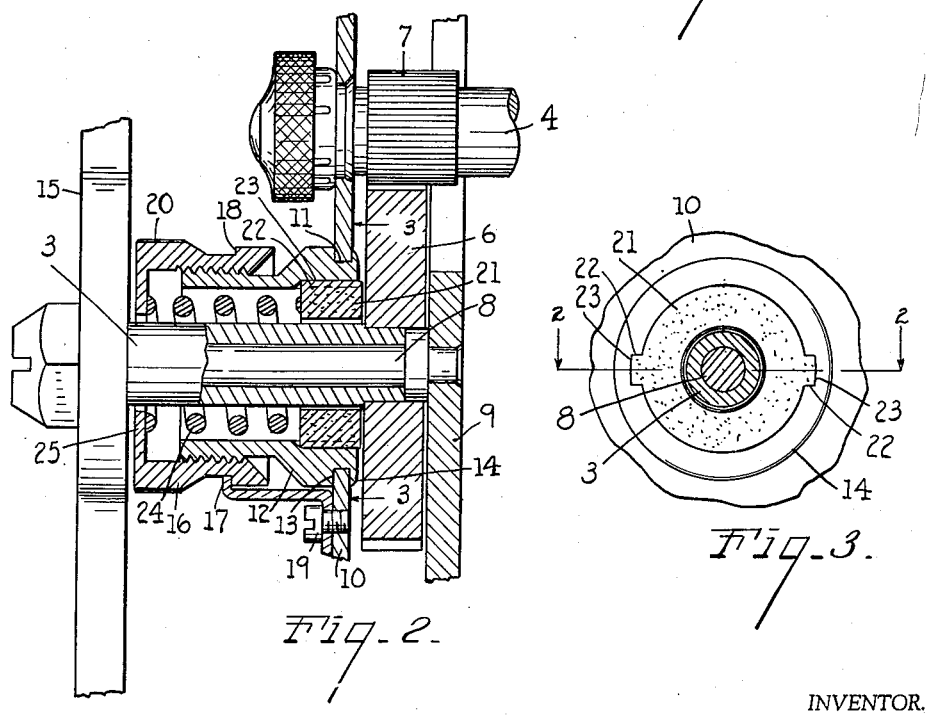
Fig. 2 is an enlarged detail view mainly in section on line 2—2 of Figs. 1 and 3.
Fig. 3 is an enlarged detail view partially in section on line 3—3 of Fig. 2.

The brake member 21 is arranged within the thimble or collar at its inner end and in a position to coact with the side of the gear 6 and is provided with splines 22 engaging splined recesses 23 in the collar. The coiled spring 24 is arranged within the collar and the adjusting member to bear against the inturned flange 25 at the outer end of the adjusting member and against the brake member so that by adjustment of the adjusting member, the tension on the spring may be increased or diminished as desired to secure the desired brake action or friction. The brake is shown in its "off" position in Fig. 2. It will be understood that by turning the adjusting member to move it inwardly, tension on the spring is increased and this increases the braking action. The stop limiting the outward adjustment of the adjusting member or nut prevents its being turned outwardly into jamming or locking relation with the crank.

It will be apparent that the structure is very simple in its parts and a minimum of strain is exerted on the parts through the braking action. However, a very substantial friction braking action may be had even with parts of small dimensions and the brake is very sensitive inasmuch as its adjustment is effected with the screw thread action—that is, the brake may be adjusted to secure any desired braking friction between the maximum and the minimum.

I have not attempted to illustrate or describe certain modifications or adaptations which I contemplate as it is believed that this disclosure will enable those skilled in the art to embody or adapt my improvements as may be desired.

Having thus described my invention, what I claim as new and desire to secure by Letters Patent, is:

1. In a fishing reel, the combination with a frame, a crankshaft rotatably mounted on said frame, and a gear mounted on said crankshaft, of a collar surrounding said crankshaft in spaced concentric relation, an annular brake member splined in said collar for coaction with the side of said gear, a coiled compression spring surrounding said crankshaft, a brake adjusting member threaded on said collar and bearing against said spring for urging said brake member into braking engagement with said gear through said spring, the adjusting member having an external annular recess, and a stop fixed to said frame for coaction with said last named recess to limit the movement of said adjusting member on said collar.

2. In a fishing reel, the combination with a frame, a crankshaft rotatably mounted on said frame, and a gear mounted on said crankshaft, of a collar surrounding said crankshaft in spaced concentric relation, an annular brake member splined in said collar for coaction with said gear, a coiled compression spring surrounding said crankshaft, and a brake adjusting member threaded on said collar and bearing against said spring for urging said brake member into braking engagement with said gear through said spring.

3. In a fishing reel, the combination with a frame, a crankshaft rotatably mounted on said frame and a gear fixedly mounted on said crankshaft, of a collar fixed to said frame and surrounding said crankshaft in spaced relation, an annular brake member splined in said collar for coaction with said gear, and means including a brake adjusting member rotatable on said collar and operatively connected to the brake member for urging said brake member into braking engagement with said gear.

4. In a fishing reel, the combination with a frame, a crankshaft rotatably mounted on said frame and a gear on said crankshaft, of a collar fixed to said frame and surrounding said crankshaft in spaced relation, a brake member disposed for engagement with the side of said gear, means restraining rotation of said brake member relative to said collar, and normally operable means threadedly engaging said collar for urging said brake member into braking engagement with said gear.

5. In a fishing reel, a spool, driving means therefor including a gear, and brake means for said spool comprising a brake member slidable axially of said spool to engage said gear, means guiding said brake member, means restraining the brake member from rotative movement relative to the guiding means, and means threadedly engaging said guiding means and cooperative therewith to actuate said brake member for braking engagement with said gear.

WILLIAM SHAKESPEARE, Jr.